US010501207B2

(12) United States Patent
Carradori et al.

(10) Patent No.: US 10,501,207 B2
(45) Date of Patent: Dec. 10, 2019

(54) SYSTEM FOR ASSISTING IN THE GUIDING OF AN AIRCRAFT ON THE GROUND

(71) Applicant: AIRBUS OPERATIONS (S.A.S.), Toulouse (FR)

(72) Inventors: Cyril Carradori, Segoufielle (FR); Ludovic Zimmermann, Frouzins (FR); Antoine Rouiller, Bouloc (FR); Patrick Orfila, Gagnac sur Garonne (FR); Philippe Couzinie, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 120 days.

(21) Appl. No.: 15/418,257

(22) Filed: Jan. 27, 2017

(65) Prior Publication Data

US 2017/0210488 A1    Jul. 27, 2017

(30) Foreign Application Priority Data

Jan. 27, 2016   (FR) ...................................... 16 50648

(51) Int. Cl.
| | |
|---|---|
| *B64F 1/22* | (2006.01) |
| *G05D 1/00* | (2006.01) |
| *B64D 47/08* | (2006.01) |
| *B64D 47/02* | (2006.01) |

(Continued)

(52) U.S. Cl.
CPC ................ *B64F 1/22* (2013.01); *B64D 47/02* (2013.01); *B64D 47/08* (2013.01); *B64F 1/002* (2013.01);

(Continued)

(58) Field of Classification Search
CPC .. B64F 1/22; B64F 1/225; B64F 1/002; B64F 5/10; H04N 7/183; H04N 5/23293;

(Continued)

(56) References Cited

U.S. PATENT DOCUMENTS

| | | | |
|---|---|---|---|
| 5,825,305 A | 10/1998 | Biferno | |
| 6,195,902 B1* | 3/2001 | Jan | G01C 15/008 33/286 |

(Continued)

FOREIGN PATENT DOCUMENTS

| | | |
|---|---|---|
| EP | 0980828 A1 | 2/2000 |
| FR | 3020041 A1 | 10/2015 |

OTHER PUBLICATIONS

French Search Report for Application No. 1650648 dated Sep. 28, 2016.

*Primary Examiner* — Susan E. Hodges
(74) *Attorney, Agent, or Firm* — Jenkins, Wilson, Taylor & Hunt, P.A.

(57) ABSTRACT

A system for assisting in guiding of an aircraft maneuvered by an aircraft tractor on the ground, the system including at least one projection device including a laser generating a laser beam fixed to an anchor point of the fuselage of the aircraft. A fixing mechanism is configured to fix the projection device to an anchor point of the fuselage, the laser beam from each laser projector then plotting a light trace on the ground to be used to assist in guiding the aircraft on the ground. A camera can film the light trace on the ground. A remote display device includes a screen, the display device being positioned on the aircraft tractor for the screen to be visible to an operator of the aircraft tractor, each projection device being connected to the display device, the display device being configured to display the image from each projection device camera.

8 Claims, 3 Drawing Sheets

(51) Int. Cl.
*H04N 7/18* (2006.01)
*B64F 5/10* (2017.01)
*G01C 15/10* (2006.01)
*H04N 5/232* (2006.01)
*B64F 1/00* (2006.01)
*G08G 5/06* (2006.01)

(52) U.S. Cl.
CPC ............... *B64F 1/225* (2013.01); *B64F 5/10* (2017.01); *G01C 15/105* (2013.01); *G08G 5/065* (2013.01); *H04N 5/23293* (2013.01); *H04N 7/183* (2013.01)

(58) Field of Classification Search
CPC ........ G08G 5/065; B64D 47/08; B64D 47/02; G01C 15/105
USPC .......................................................... 348/117
See application file for complete search history.

(56) References Cited

U.S. PATENT DOCUMENTS

| | | | |
|---|---|---|---|
| 6,405,975 B1* | 6/2002 | Sankrithi | B64D 47/08 244/1 R |
| 2003/0174209 A1* | 9/2003 | Piazzi | G06K 7/10722 348/135 |
| 2004/0125356 A1* | 7/2004 | Connolly | G01C 15/002 356/4.08 |
| 2005/0196256 A1* | 9/2005 | Rodenkirch | B64F 1/22 414/426 |
| 2009/0182506 A1 | 7/2009 | Yun | |
| 2015/0203157 A1* | 7/2015 | Oren | B64F 1/22 701/41 |
| 2015/0206439 A1* | 7/2015 | Marsden | G08G 5/025 701/301 |

\* cited by examiner

SYSTEM FOR ASSISTING IN THE GUIDING OF AN AIRCRAFT ON THE GROUND

CROSS-REFERENCE TO RELATED APPLICATION

This application claims the benefit of and priority to French patent application No. 16 50648 filed on Jan. 27, 2016 the entire disclosure of which is incorporated by reference herein.

TECHNICAL FIELD

The present disclosure relates to a system for assisting in the guiding of an aircraft on the ground, and a method for installing the system on the aircraft.

BACKGROUND

In order to be able to park several aircraft alongside one another in an airport terminal, an aircraft hangar or any other building, it is important to be able to accurately guide the aircraft in maneuvers on the ground. In effect, the space available between each aircraft can be of the order of thirty or so centimetres whereas an aircraft wing span can typically be more than sixty metres.

Conventionally, in order to assist an operator of an aircraft tractor in positioning an aircraft with sufficient accuracy, plumb lines are fixed to anchor points located under the fuselage of the aircraft, in the plane of symmetry of the fuselage. The plumb lines thus make it possible to show the plane of symmetry of the fuselage on the ground. The operator of the aircraft tractor can then align this plane of symmetry shown by plumb lines with a marking on the ground in order to position the aircraft. Furthermore, targets on the marking on the ground make it possible to position the aircraft on the axis defined by the marking on the ground by indicating the final position of the plumb lines, the plumb lines then having to be directly above the targets.

FIG. 1 shows, for example, an airport terminal comprising several placements 100, 101 and 103 intended to accommodate the aircraft 110, 111 and 112. Markings on the ground 120, 121 and 122 define theoretical position of the planes of symmetry of the fuselage of the aircraft 110, 111 and 112 correctly positioned in their respective placements 100, 101 and 102. The aircraft 111, in its stop or parking position, is parked between the aircraft 110 and 112. The aircraft 111 has potentially little space to be correctly positioned in its placement 101 while remaining away from the aircraft 110 and 112 parked alongside. As has been stated, in practice, the distances D1 and D2—D1 representing the distance between the aircraft 110 and 111 and D2 the distance between the aircraft 111 and 112—can thus be of the order of thirty or so centimetres whereas an aircraft wing span can typically be more than sixty metres. An operator of an aircraft tractor used to move the aircraft 111 must therefore have a visual aid or a system for assisting in the guiding of the aircraft 111 in order to be able to perform the operation of positioning this aircraft 111 between the aircraft 110 and 112 with the necessary degree of accuracy.

FIG. 2 is an illustration of a known system for assisting in the guiding of an aircraft on the ground. Conventionally, plumb lines 201 and 202 are used. The plumb lines 201 and 202 are fixed to anchor points present under the fuselage, located in the plane of symmetry of the fuselage, at the front and at the rear of the aircraft 111 and so as to show the vertical plane containing the longitudinal axis of the aircraft 111. These plumb lines 201 and 202 allow an operator driving an aircraft tractor 210 used to move the aircraft 111 to see the position of the axis of the aircraft 111 relative to the marking on the ground 121. Thus, the operator seeing the plumb lines 201 and 202 above the marking 121 makes it possible for the operator to ensure that the axis of the aircraft 111 is indeed in the vertical plane defined by the marking on the ground 121, thus guaranteeing that the ends of the wings of the aircraft 111 will not touch the aircraft 110 or 112. The positioning of the aircraft 111 on the longitudinal axis defines by the marking on the ground 121 is done by marking out two targets (not represented) on the ground, each target defining a vertical position for the plumb lines 201 and 202 fixed under the fuselage of the aircraft 111. Thus, the positioning of the targets on the axis 121 makes it possible to adjust the position of the nose of the aircraft 111 relative to its placement 101.

Although such a system is satisfactory, it is sensitive to disturbances provoked by the movements of the aircraft or by the wind, disturbances which can cause oscillations of the plumb lines and thus slow down the positioning manoeuvre. It is in fact necessary to wait for the oscillations of the plumb lines to stop to use the system for assisting in the guiding of an aircraft on the ground described previously.

Patent application US 2009/182506 A1 discloses a collision-preventing system for airplane moving on ground; such system is nevertheless not adapted for assisting in the guiding of an aircraft on the ground by an aircraft tractor.

SUMMARY

One object of the present disclosure is a system for assisting in the guiding of an aircraft on the ground, a device which is insensitive to these disturbances.

To this end, a system is disclosed for assisting in the guiding of an aircraft on the ground, the aircraft being maneuvered by an aircraft tractor, the system comprises at least one projection device, each projection device being fixed to an anchor point of the fuselage of the aircraft, each projection device comprising a laser projector, the laser projector generating a laser beam plotting at least one light trace on the ground, a spirit level integral to the laser projector, the spirit level being configured to make it possible to adjust the verticality of the laser beam generated by the laser projector, a camera making it possible to film the light trace on the ground, a fixing mechanism configured to fix the projection device to the anchor point of the fuselage and comprising an adjustment mechanism to which the laser projector is fixed, the adjustment mechanism being configured to make it possible to adjust the position of the laser projector relative to the fuselage in order to ensure at least the verticality of the laser beam generated. The system likewise comprises a display device comprising a screen, the display device being positioned on the aircraft tractor for the screen to be visible to an operator of the aircraft tractor, each projection device being connected to the display device, the display device being configured to display the image from the camera of each projection device.

Advantageously, the projection device can then be used instead of a plumb line, by using the same anchor points on the fuselage and the same targets drawn on the marking on the ground. It is also possible to transfer the display from the camera to a display device. It is thus possible to remotely and accurately guide the aircraft on the ground, typically from the driving position in the aircraft tractor.

According to an embodiment of the disclosure herein, at least one projection device is connected to a relay device, the connection between at least the projection device and the display device being made via the relay device, the connection between the relay device and the display device being made by a wireless technology.

Advantageously, the wireless connection between the relay device and the display device makes it possible to dispense with connecting cables that are particularly bulky or cumbersome when the distance between the projection device and the display device is great. The relay device is thus advantageously placed alongside the projection device and is connected to the projection device in place of a display device. The display of the image from the camera can then be transferred over a great distance.

According to an embodiment of the disclosure herein, the axis of sight of the camera of the projection device is vertical, to the ground, its upwards extension comprising the anchor point of the fuselage to which the projection device is fixed, the camera then filming the light trace on the ground under the anchor point.

According to an embodiment of the disclosure herein, the laser projector is a rotary laser level generating a plane by sweeping of the laser beam generated, the laser beam plotting a light trace on the ground and the fuselage.

According to an embodiment of the disclosure herein, the aircraft having a fuselage comprising a vertical plane of symmetry, the rotary laser level is configured to generate a vertical plane by sweeping of the laser beam, the vertical plane comprising the anchor point of the fuselage to which the projection device is fixed, the adjustment mechanism making it possible to align the light trace on the fuselage with a marker present on the fuselage in order to superimpose the vertical plane generated by the rotary laser level with the plane of symmetry of the fuselage of the aircraft.

Advantageously, the superimposition of the plane generated by the rotary laser level on the plane of symmetry of the fuselage of the aircraft makes it possible to see this plane of symmetry of the fuselage on the ground by virtue of the light trace plotted on the ground by the rotary laser level, and, through the use of a marking on the ground, accurately position the axis of the aircraft relative to this marking on the ground.

Advantageously, the vertical plane generated by the rotary laser level comprises the anchor point on the fuselage. Assuming that this anchor point belongs to the plane of symmetry of the fuselage, it is then necessary only to align the light trace on the fuselage with a single point to superimpose the plane generated by the rotary laser level with the plane of symmetry of the fuselage. In effect, the fact that the plane generated by the rotary laser level is vertical, like the plane of symmetry of the fuselage, and comprises the anchor point requires no more than an alignment with another marker included in the plane of symmetry of the fuselage. The adjustment operation is therefore facilitated because it requires only a single alignment of the light trace on a marker judiciously chosen as contained in the plane of symmetry of the fuselage.

An object of the present disclosure also relates to a method for installing a system for assisting in the guiding of an aircraft on the ground, the aircraft being maneuvered by an aircraft tractor, the system comprising: at least one projection device, each projection device being fixed to an anchor point of the fuselage of the aircraft, each projection device comprising: a laser projector, the laser projector generating at least one laser beam, a fixing mechanism configured to fix the projection device to an anchor point of the fuselage and comprising an adjustment mechanism to which the laser projector is fixed, the adjustment mechanism being configured to make it possible to adjust the position of the laser projector relative to the fuselage in order to ensure at least the verticality of the laser beam generated, the laser beam from each projection device then plotting a light trace on the ground intended to be used to assist in the guiding of the aircraft on the ground, a spirit level integral to the laser projector, a camera making it possible to film the light trace on the ground, the system also comprising a display device comprising a screen, the display device being positioned on the aircraft tractor for the screen to be visible to an operator of the aircraft tractor, each projection device being connected to the display device, the display device being configured to display the image from the camera of each projection device. The method comprises the following steps: fixing the projection device to an anchor point of the fuselage by the fixing mechanism, adjusting, by the adjustment mechanism and the spirit level of the projection device, at least the verticality of the laser beam generated by the laser projector, the laser projector then plotting a light trace on the ground intended to be used to assist in the guiding of the aircraft on the ground, fixing the display device to the aircraft tractor in a way that is visible to an operator of the aircraft tractor and connecting the projection device and the display device in order for the display device to display the image filmed by the projection device.

According to a complementary embodiment of the disclosure herein, the aircraft having a fuselage comprising a vertical plane of symmetry, the laser projector being a rotary laser level configured to define a plane by the sweeping of the laser beam, the laser beam plotting a light trace on the ground and the fuselage, the adjustment step comprises the steps of: adjusting, by the adjustment mechanism and of the spirit level of the projection device, the verticality of the plane generated by the rotary laser level and using the adjustment mechanism to make the light trace on the fuselage generated by the laser beam from the rotary laser level coincide with at least two markers present on the fuselage in order to superimpose the vertical plane generated by the rotary laser level on the plane of symmetry of the fuselage.

According to a complementary embodiment of the disclosure herein, the vertical plane defined by the sweeping of the laser beam comprising the anchor point of the fuselage when the projection device is fixed to this anchor point, the step of making the light trace generated by the laser beam from the rotary laser level coincide on the fuselage is done by using a marker present on the fuselage in order to superimpose the vertical plane generated by the rotary laser level on the plane of symmetry of the fuselage.

BRIEF DESCRIPTION OF THE DRAWINGS

The features of the disclosure herein mentioned above, and others, will become more clearly apparent on reading the following description of an exemplary embodiment, the description being given in relation to the attached drawings, in which.

DETAILED DESCRIPTION

Figure 3:
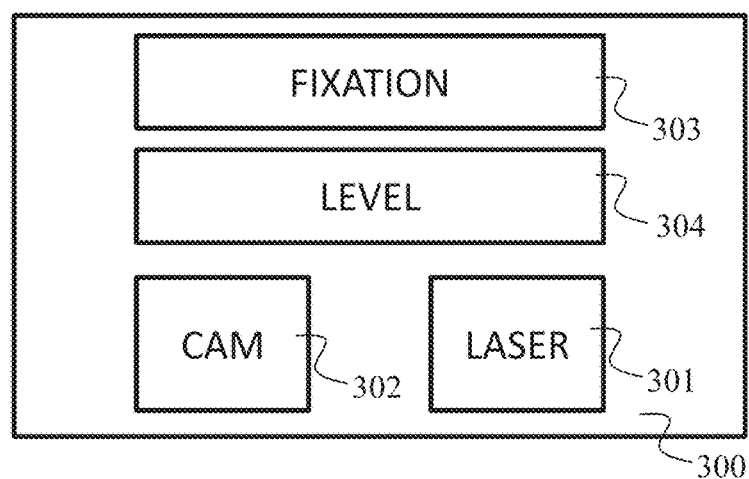
FIG. 3 is a schematic illustration of the architecture of a device used to assist in the guiding of an aircraft on the ground according to an embodiment of the disclosure herein.

FIG. 3 is a schematic illustration of the architecture of a device 300, called projection device 300, making it possible to assist in the guiding of an aircraft 111 on the ground according to an embodiment of the disclosure herein. The projection device 300 for assisting in the guiding of the aircraft 111 on the ground comprises fixing mechanism 303 for fixing to an anchor point of the fuselage of the aircraft 111, for example an anchor point used to fix the plumb line 201 or 202. The fixing mechanism 303 comprises mechanism(s) for adjusting the position of the device relative to the fuselage. The fixing mechanism 303 for fixing to the fuselage can comprise a ball lock pin that can be inserted into an anchor point or housing provided for this purpose under the fuselage of the aircraft 111. The fixing mechanism 303 can conform to the standard NSA9501-100. The projection device 300 comprises a laser projector 301.

According to a first embodiment of the disclosure herein, the laser projector 301 generates a laser beam.

According to a second embodiment of the disclosure herein, the laser projector 301 is a rotary laser level 301, that is to say that the laser beam generated by the laser projector 301 is deflected by a rotating mirror in order to define a plane by sweeping of the laser beam. In other words, the rotary laser level 301 is configured to define a plane by sweeping of the laser beam.

According to an embodiment complementing the second embodiment of the disclosure herein, the plane defined by sweeping is vertical and comprises the anchor point of the fuselage when the device is fixed to this anchor point.

In the case of a laser projector 301 generating a laser beam, the fictitious axis defined by the laser beam can likewise comprise the anchor point of the fuselage to which the device 300 is fixed, the spot light trace then defined being on the ground on the vertical from the anchor point.

The laser beam from the laser projector 301 plots a light trace on the ground intended to be used to assist in the guiding of the aircraft 111 on the ground. In the case of a laser projector 301 with a single laser beam, the light trace is a spot trace, on the ground and in an axis of the laser projector 301. In the case of a laser projector 301 of rotary laser level type, the light trace is a light line on the ground and on the fuselage of the aircraft 111.

According to an embodiment of the disclosure herein, the rotary laser level 301 comprises an automatic levelling system, that is to say the rotary laser level 301 can generate a vertical plane independently.

According to a complementary embodiment of the disclosure herein, the device 300 comprises a spirit level 304 integral to the rotary laser level 301, the spirit level 304 being used to check the verticality of the rotary laser level 301. The adjustment mechanism for the fixing mechanism 303 make it possible to ensure the adjustment of the spirit level 304 and therefore the verticality of the plane generated by the rotary laser level 301. The adjustment mechanism for the fixing mechanism 303 of the device also makes it possible to superimpose the vertical plane generated by the rotary laser level 301 with the plane of symmetry of the fuselage of the aircraft.

According to a complementary embodiment, the projection device 300 comprises a camera 302. The camera 302 makes it possible to film the ground under the aircraft 111, and therefore see the position of the light trace on the ground relative to the marking on the ground 121. It is thus possible to transfer the display of what is filmed by the camera 302 to another display device comprising a screen, for example a display device 404 described hereinbelow.

Advantageously, the axis of sight of the camera 302 is vertical and comprises the anchor point of the fuselage when the projection device is fixed to this anchor point and the plane generated by the rotary laser level 301 is superimposed on the plane of symmetry of the fuselage. The camera 302 then films the light trace on the ground located under the anchor point, vertical to it. In other words, in this case, the camera 302 films the ground directly under the anchor point. Thus, in this position, the camera 302 aims along the same vertical axis as a plumb line 201 or 202 which would be fixed to the same anchor point of the fuselage. Thus, if a position of the aircraft above the marking line on the ground 121 is obtained in the known solution when the plumb lines 201 or 202 are vertical to a target placed on the marking 121, the same position of the aircraft 111 is obtained when this same target is in the axis of sight of the camera 302. In other words, the targets placed for an implementation of the known solution using plumb lines can be reused according to this embodiment of the disclosure herein.

Figure 4:
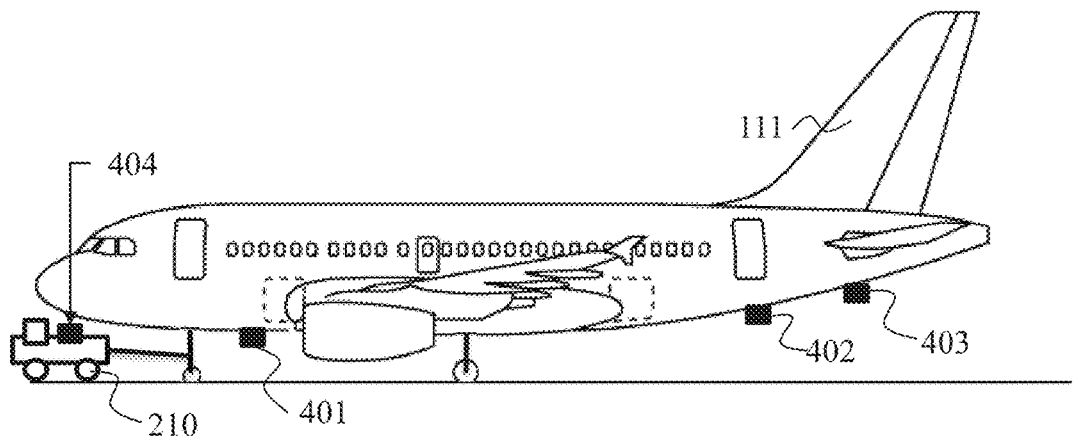
FIG. 4 is a schematic illustration of the implementation of a system for assisting in the guiding of an aircraft on the ground according to an embodiment of the disclosure herein.

FIG. 4 is a schematic illustration of the implementation of a system for assisting in the guiding of an aircraft 111 on the ground according to an embodiment of the disclosure herein. In this embodiment, the laser projector 301 is a rotary laser level. The aircraft 111 is moved or maneuvered on the ground by an aircraft tractor 210, the aircraft tractor 210 being driven by an operator. The system for assisting in the guiding of the aircraft 111 on the ground comprises projection devices 401 and 403 for assisting in the guiding of the aircraft 111 on the ground, the projection devices 401 and 403 in the embodiment described in FIG. 4 comprising cameras. The projection devices 401 and 403 are fixed to anchor points under the fuselage of the aircraft 111. The system comprises a display device 404, comprising one or more screens, positioned on the aircraft tractor 210 for the screen or screens to be visible to the operator of the aircraft tractor 210 when manoeuvring the aircraft 111.

The projection device 401 is connected to the display device 404 by a wired link which is not represented. The projection device 403 is connected to the relay device 402 by a wired link that is not represented. The relay device 402 is connected to the display device 404 by a wireless link, for example of Wi-Fi (Wireless Fidelity) type. The display device 404 comprises a connection for one or more wired links, each wired link making it possible to connect a projection device according to the projection device 300 comprising a camera described previously, here the projection device 401. The display device 404 comprises a wireless connection, making it possible to connect the relay device 402, the latter being connected via a wired link to the projection device 403. The projection device 403 is connected to the display device 404 via the relay device 402 which ensures the conversion of the connection from a wireless technology to a wired technology.

In other words, the projection devices 401 and 403 can be connected directly to the display device 404 via a wired link. Only, the projection device 403 being positioned at the rear of the fuselage of the aircraft 111, a relay device 402 is used as relay to avoid the use of an excessively long wired link between the devices 404 and 403. The projection device 403 is therefore connected via a wired link to the relay device 402. The relay device 402 ensures a conversion of this wired link to a wireless technology in order to allow the connection of the projection device 403 to the display device 404.

The connections between the different devices, wired or wireless, make it possible to transport data streams, the data streams corresponding for example to video data streams, typically what is filmed by the cameras of the projection devices 401 and 403.

Each projection device 401 or 403 comprises mechanism(s) for fixing the projection device 401 or 403 to an anchor point located under the fuselage of the aircraft 111, the fixing mechanism comprising mechanism(s) for adjusting the position of the projection device 401 or 403 relative to the fuselage of the aircraft 111 and a rotary laser level 301. The rotary laser level 301 is configured to generate a plane by sweeping of the laser beam. The mechanism(s) for adjusting the position of each projection device 401 or 403 make it possible to generate a vertical plane and superimpose this vertical plane with the plane of symmetry of the fuselage of the aircraft 111.

Each projection device 401 or 403 comprises a spirit level integral to the rotary laser level, the spirit level being configured to make it possible to ensure the verticality of the plane generated by the rotary laser level. The mechanism(s) for adjusting the position of each projection device 401 or 403 make it possible to adjust the position of the rotary laser level relative to the anchor point of the fuselage, and consequently obtain the verticality of the plane.

Each projection device 401 or 403 comprises a camera. Each camera films under the aircraft and makes it possible to see the position of the light trace relative to the marking on the ground 121. According to a complementary embodiment, each camera is configured for its axis of sight to be vertical, aiming towards the ground, and for the upward extension of the axis of sight to include the anchor point of the fuselage of the aircraft 111 when the vertical plane generated by the rotary laser level is superimposed with the plane of symmetry of the fuselage of the aircraft. The axis of sight then corresponds to an aiming of the camera 302 vertically downwards from the anchor point.

The display device 404 is configured to display the image or the video from the camera of each projection device 401 and 403. The data streams corresponding to the images or videos captured by the cameras pass via the wired or wireless connections between the devices, possibly by passing through the relay device 402 in the case of the projection device 403.

Figure 1:
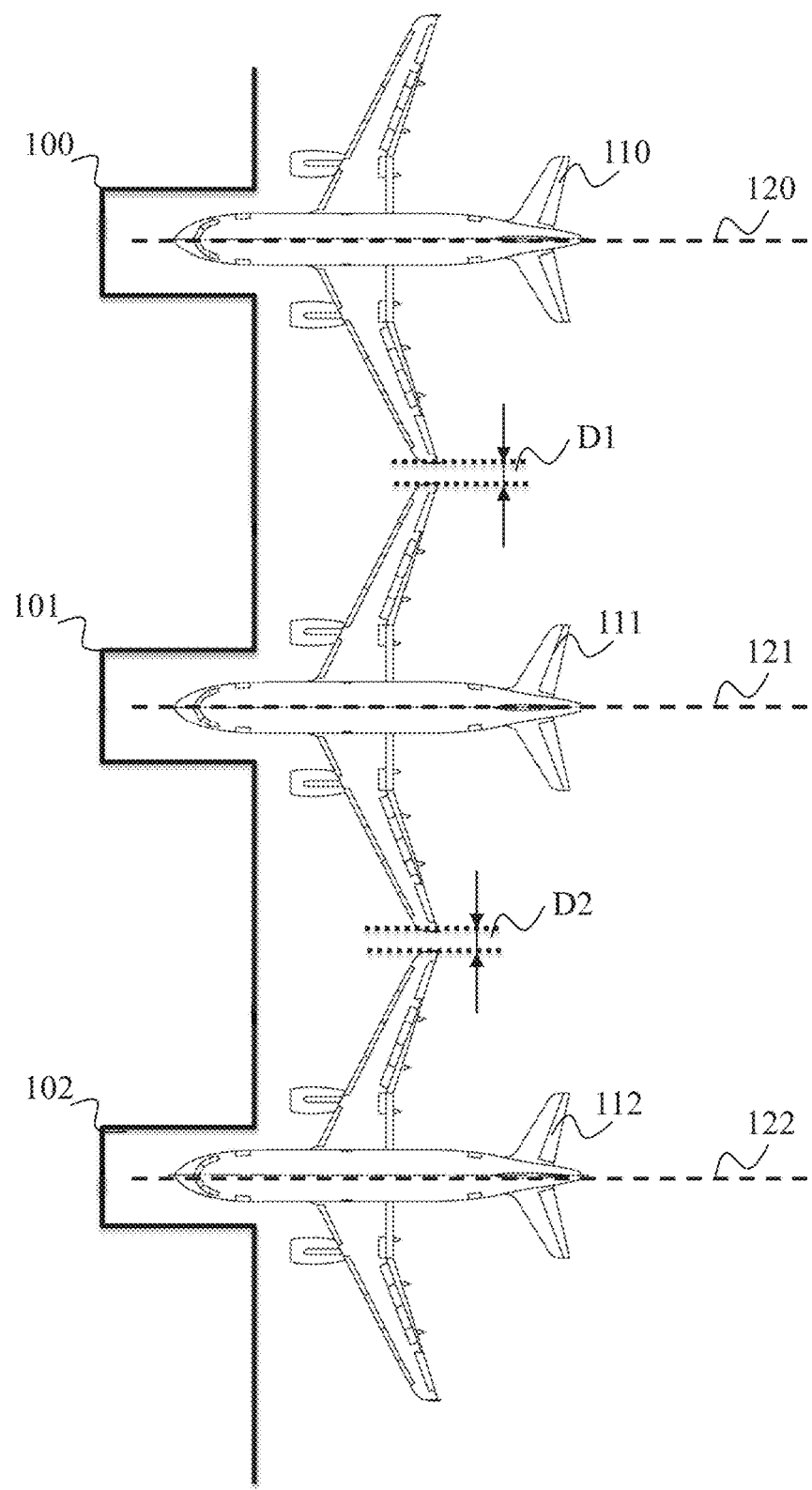
FIG. 1 is an illustration of a situation in which a device for assisting in the guiding of an aircraft on the ground is implemented.
Figure 2:
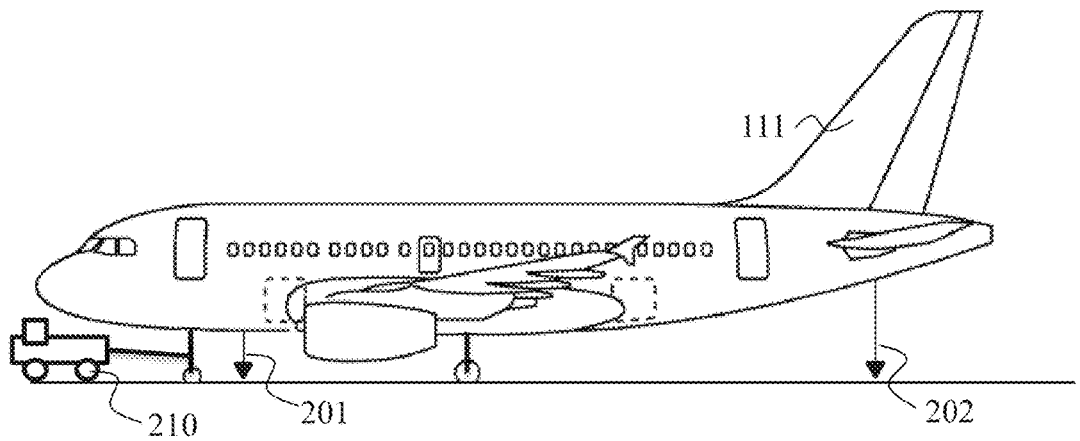
FIG. 2 is a schematic representation of the implementation of a known solution for assisting in the guiding of an aircraft on the ground.

The devices 401, 402 and 403 are fixed to anchor points of the fuselage of the aircraft 111. The projection device 401 can be fixed to the same anchor point of the fuselage of the aircraft 111 as that used to fix the plumb line 201 in the known solution described previously. Likewise, the projection device 403 can be fixed to the anchor point in place of the plumb line 202. Advantageously, that makes it possible for the solution that is the subject of the disclosure herein to be compatible with the marking on the ground used by the plumb line-based known solution illustrated in FIG. 2 if the axes of sight of the cameras of the projection devices 401 and 403 are vertical to the anchor points.

Figure 5:
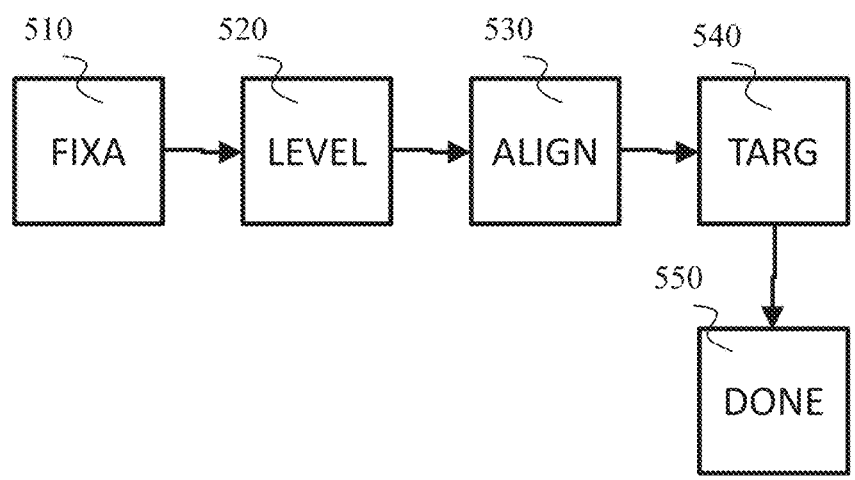
FIG. 5 is a flow diagram of a method for implementing a device used to assist in the guiding of an aircraft on the ground according to an embodiment of the disclosure herein.

FIG. 5 is a flow diagram of a method for installing a projection device 300 for assisting in the guiding of an aircraft 111 on the ground according to an embodiment of the disclosure herein. The projection device 300 concerned can be the projection device 401 or the projection device 403 as illustrated in FIG. 4. In this embodiment, the laser projector 301 is a rotary laser level.

In a first step 510, the projection device 300 is fixed to an anchor point located under the fuselage of the aircraft 111. Advantageously, the anchor point is one of the anchor points to which the plumb lines 201 and 202 are fixed in the known solution illustrated in FIG. 2. The anchor point is then contained in the plane of symmetry of the fuselage of the aircraft 111. The projection device 300 is fixed to the anchor point of the fuselage of the aircraft 111 by the fixing mechanism 303. The fixing can be done by locking a ball lock pin, for example of NSA 9501-100 type, in the anchor point of the fuselage. It may be necessary to mark an orientation of the projection device 300 before fixing this device to the anchor point of the fuselage.

According to an embodiment, the fixing step 510 is done in order for the adjustment mechanism for the fixing mechanism to be in contact with the fuselage. The adjustment mechanism can for example comprise three rods terminated by blocks, each block being designed to bear on the fuselage, each rod being able to be adjusted lengthwise in order to adjust the position of the projection device 300 by acting on the length of the three bearing rods.

The adjustment mechanism can comprise a guide way in order to adjust the positioning of the projection device 300 in translation relative to its anchor point. The adjustment mechanism can comprise a ball joint, allowing a certain degree of rotation of the projection device about the anchor point under the fuselage, the ball joint being able to comprise an adjustment mechanism in order to block the ball joint in a position.

If the projection device 300 comprises a camera, the projection device 300 comprises a connection allowing for the connection of a cable. The cable allows for a wired link in order to allow for the transfer of the data corresponding to a video stream from the camera. The other end of this cable is intended to be connected either to the relay device 402 in the case where the projection device 300 is the projection device 403, or directly to the display device 404 in the case where the projection device 300 is the projection device 401. In the first case, the projection device 403 and the display device 404 are connected via a wireless link, for example of Wi-Fi type. This wireless link advantageously makes it possible to dispense with a long cable which would be cumbersome. Advantageously, the relay device 402 is placed under the fuselage so as to ensure a direct propagation to the display device 404 of the radio waves used for the wireless link.

In a second step 520, the position of the projection device 300 is adjusted by the adjustment mechanism and the spirit level 304 in order to ensure the verticality of the plane generated by the rotary laser level 301 and ensure that this plane includes the anchor point of the fuselage. For example, it is possible to act on the length of the three rods bearing on the fuselage of the aircraft 111 in order to act on the rotation of the projection device 300 about a ball joint ensuring the link to the fixing at the anchor point.

If the rotary laser level 301 does not comprise an automatic levelling system, the step 520 makes it possible to guarantee the verticality of the plane generated by the rotary laser level 301 and, at the same time, guarantee that the vertical plane thus generated by the rotary laser level 301 does indeed include the anchor point of the fuselage of the aircraft 111. In this case, the rotary laser level 301 is configured for the plane swept by the laser beam to include the position of the anchor point.

If the rotary laser level 301 comprises an automatic levelling system, the adjustment of the spirit level 304 makes it possible to ensure that the vertical plane generated by the rotary laser level 301 does indeed include the anchor point of the fuselage of the aircraft 111. In this case, the projection device 300 is configured for the plane generated by the rotary laser level 301 to include the anchor point when the spirit level is adjusted. In other words, the vertical plane generated by the rotary laser level 301 automatically and the vertical plane including the anchor point and parallel to this vertical plane generated by the rotary laser level 301, are superimposed when the spirit level is correctly adjusted. If the spirit level is not correctly adjusted, then the plane generated by the rotary laser level 301 still remains vertical since the rotary laser level includes an automatic levelling system. However, this plane generated by the rotary laser level 301 would not include the anchor point.

This step 520 also allows for the correct positioning of the camera 302 when the camera 302 is configured to film along a vertical axis when the vertical plane generated by the rotary laser level 301 is superimposed with the plane of symmetry of the fuselage of the aircraft 111.

In a step 530, the vertical plane generated by the rotary laser level 301 is superimposed on the plane of symmetry of the fuselage by the adjustment mechanism for the fixing mechanism. This step may require only a simple rotation of the projection device 300 about the vertical axis passing through the anchor point of the fuselage. It may however be necessary to then readjust the adjustment mechanism of the fixing mechanism 303 in order to restore the adjustment of the spirit level 304. In effect, the adjustment of the fixing mechanism may be disturbed by the rotation. Such is the case if, for example, the fuselage has defects on its surface or a curvature which is such that blocks bearing on the fuselage in one position would no longer be so after the rotation. The superimposition is verified by the alignment of the light trace plotted by the rotary laser level 301 on the surface of the fuselage of the aircraft 111 with at least one marker. The marker is for example a water drain present on the fuselage and placed in the plane of symmetry of the fuselage. In other words, it is verified that the light trace plotted on the fuselage of the aircraft 111 passes through at least this marker. Any marker present under the fuselage and placed in the plane of symmetry of the fuselage can be used for this alignment. The plane of symmetry of the fuselage of the aircraft 111 is vertical and the anchor point is included in the plane of symmetry of the fuselage. Knowing that, the verticality of the plane generated by the rotary laser level 301 and the fact that this plane contains both the anchor point of the fuselage and another, different, marker, also present in the plane of symmetry of the fuselage, guarantee the superimposition of the plane generated by the rotary laser level 301 and the plane of symmetry of the fuselage of the aircraft 111. The light trace plotted by the rotary laser level 301 on the ground then corresponds to the axis of the aircraft 111. In other words, the light trace on the ground then corresponds to the intersection of the plane of symmetry of the fuselage with the ground. The projection device 300 can be used for the guiding of the aircraft 111 by comparing the light trace plotted on the ground with the marking on the ground 121

The display device 404 makes it possible to transfer the display from the cameras of the projection devices 401 and 403. The display device 404 is positioned on the aircraft tractor 210 for its screen or screens to be visible to the operator of the aircraft tractor 210. The display device 404 can comprise one or more screens in order to display, either simultaneously or sequentially, the displays from the cameras of the projection devices 401 and 403.

According to an alternative embodiment, the projection device 300 may not include a camera. The comparison between the position of the light trace and the marking on the ground 121 can then be done directly by eye by the operator of the aircraft tractor 210. The devices 402 and 404 are not useful in this situation.

According to an embodiment of the disclosure herein, a single projection device 300 is used, for example the projection device 401 or the projection device 403.

According to an embodiment of the disclosure herein, two or more devices 300 are fixed under the fuselage of the aircraft, for example three devices 300. The number of devices 300 to be used can be chosen according to the size of the aircraft 111 to be guided on the ground. It should be noted that the light traces from the different projection devices 300 are merged since they all define one and the same axis on the ground.

According to an embodiment of the disclosure herein, one or more devices 300 are used in association with one or more plumb lines 201 or 202.

According to an embodiment of the disclosure herein, the projection device 300 comprises a fixing, called gauge rod fixing, making it possible to fix a plumb line. This fixing is such that, when the spirit level 304 is adjusted and the vertical plane generated by the rotary laser level 301 is superimposed with the plane of symmetry of the fuselage of the aircraft 111, then the plumb line fixed to the so-called gauge rod fixing indicates a direction contained in the plane of symmetry of the fuselage. In other words, in this case, the plumb line indicates a position above the light trace plotted by the rotary laser level 301. That makes it possible to check that the plane generated by the rotary laser level 301 is vertical.

If the projection device 300 comprises a camera 302, and the axis of sight of the camera 302 is vertical and comprises the anchor point of the fuselage when the projection device is fixed to this anchor point, then the end of the plumb line fixed to the so-called gauge rod fixing is in the axis of sight of the camera 302. Advantageously, it is then possible to check the projection device 300 is correctly adjusted by using a plumb line fixed to such a fixing called gauge rod fixing.

Generally, if the projection device 300 is intended to be fixed to an anchor point under the fuselage contained in the axis of symmetry of the fuselage, it is advantageous for the rotary laser level 301 to be configured in order for the plane generated by the sweeping of the laser beam to include the anchor point when the projection device is fixed to this anchor point. Thus, the adjustment of the superimposition of the plane generated by the rotary laser level 301 with the plane of symmetry of the fuselage is guaranteed by two steps. First of all, a step of adjustment of the verticality of the plane generated by the rotary laser level 301. This adjustment is formed by the adjustment mechanism of the fixing mechanism of the projection device 300, the spirit level 304 making it possible to ensure the correct adjustment of the verticality. Then, a step of alignment of the light trace plotted by the rotary laser level 301 on the fuselage with at least one marker present on the fuselage and contained in the plane of symmetry of the fuselage. The step of alignment can implement adjustment mechanism(s) making it possible to rotate the projection device 300 about the vertical axis passing through the anchor point. A single marker is sufficient to obtain the desired result, that is to say the superimposition of the plane generated by the rotary laser level 301 with the plane of symmetry of the fuselage since the anchor point itself forms part of the plane of symmetry of the fuselage. The operations of adjustment of the projection device 300 in order to obtain the desired superimposition of the planes are therefore simple adjustment steps, the step of rotation about a vertical axis to obtain the alignment on a marker not disrupting the verticality set in the preceding step. Thus, the projection device 300 can be adjusted simply in two steps, without having to proceed with iterative steps.

According to an alternative embodiment, the projection device 300 is intended to be fixed to an anchor point under the fuselage, the anchor point not forming part of the plane of symmetry of the fuselage. The adjustment mechanism of the projection device 300 then comprise mechanism(s) for translating the rotary laser level 301 in order to allow for an adjustment of the position of the rotary laser level 301 relative to the fuselage. The adjustment of the superimposition of the plane generated by the rotary laser level 301 with the plane of symmetry of the fuselage is guaranteed by two steps. First of all, a step of adjustment of the verticality of the plane generated by the rotary laser level 301. This adjustment is performed by the adjustment mechanism of the fixing mechanism of the projection device 300, the spirit level 304 making it possible to ensure the correct adjustment of the verticality. Then, a step of alignment of the light trace plotted by the rotary laser level 301 on the fuselage with at least two markers present on the fuselage and contained in the plane of symmetry of the fuselage. It is in fact here necessary to align the light trace plotted by the rotary laser level 301 on the fuselage with at least two markers contained in the plane of symmetry. It may be possible to obtain the desired alignment by proceeding with successive translation and rotation steps. This latter step is therefore iterative. This adjustment mode, while it makes it possible to ultimately obtain a satisfactory adjustment making it possible to obtain an assistance in the effective guidance of the aircraft 111 on the ground, is not however as simple to implement as in the case where the projection device 300 is intended to be fixed to an anchor point contained in the plane of symmetry of the fuselage. It is however not always possible to have such an anchor point.

According to yet another possible embodiment, the projection device 300 is intended to be fixed to an anchor point under the fuselage, the anchor point not forming part of the plane of symmetry of the fuselage, and the laser projector generates a laser beam plotting at least one light trace on the ground, vertical to the anchor point. In this case, a specific marking is provided on the ground, which is intended to be located vertical to this anchor point when the aeroplane is in the desired position.

The use of a projection device 300 comprising a rotary laser level 301 makes it possible to advantageously replace the known solution using plumb lines. In effect, a system comprising one or more projection devices 300 is insensitive to the disturbances of wind or aircraft movement type.

The use of a projection device 300 comprising a camera 302 makes it possible to place a target on the marking on the ground, the correct position of the aircraft 111 above the marking on the ground 121 being obtained when the target appears in the axis of sight of the camera. This solution makes it possible to advantageously replace the known solution with plumb lines but requires new targets to be prepositioned in the axis of sight of the camera. This solution further makes it possible to simplify the work of an operator who can more easily view, on a display device 404, the position of the light trace relative to the marking on the ground. That is particularly true for a very long aircraft, the operator possibly not being able to see a plumb line placed at a great distance.

The use of projection devices 300 comprising a camera 302, the axis of sight of which is vertical and includes the anchor point of the fuselage when the projection device is fixed to this anchor point, makes it possible to advantageously replace the plumb lines 201 or 202 of the known solution. In effect, the solution is then insensitive to wind or movements of the aircraft. Furthermore, the targets on the marking 121 allowing for the positioning of the aircraft on the longitudinal axis used in the known solution with plumb lines can be reused in this solution, the aircraft then being in its parking position when these same targets appear in the axis of sight of the cameras 302.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for assisting in guiding an aircraft being maneuvered on a ground by an aircraft tractor, the system comprising:
    at least one projection device comprising:
        a laser projector arranged to generate a laser beam plotting at least one light trace on the ground;
        a spirit level integral to the laser projector, the spirit level being configured to check a verticality of the laser beam generated by the laser projector; and
        a camera arranged to film the light trace on the ground;
        wherein the at least one projection device is attached to an anchor point of a fuselage of the aircraft; and
        wherein a position of the laser projector is adjustable relative to the fuselage to ensure at least the verticality of the laser beam generated; and a display device comprising a screen, the display device being positioned on the aircraft tractor for the screen to be visible to an operator of the aircraft tractor;

wherein each projection device is connected to the display device and the display device is configured to display the image from the camera of each projection device.

2. The system according to claim 1, wherein one or more of the at least one projection device is connected to a relay device, the connection between the projection device and the display device being made via the relay device and the connection between the relay device and the display device being made by a wireless technology.

3. The system according to claim 1, comprising an axis of sight of the camera of the projection device being vertical, to the ground, its upwards extension comprising the anchor point of the fuselage to which the projection device is fixed, the camera then filming the light trace on the ground under the anchor point.

4. The system according to claim 1, the laser projector being a rotary laser level configured to generate a plane by a sweeping of the laser beam to plot a light trace on the ground and the fuselage.

5. The system according to claim 1, the laser projector being a rotary laser level configured to generate a vertical plane by a sweeping of the laser beam, the vertical plane comprising the anchor point of the fuselage to which the projection device is fixed, wherein the position of the laser projected is adjustable to align the light trace on the fuselage with a marker present on the fuselage to superimpose the vertical plane generated by the rotary laser level on a vertical plane of symmetry of the fuselage of the aircraft.

6. A method for installing a system for assisting in guiding an aircraft being maneuvered on a ground by an aircraft tractor, the system comprising:

at least one projection device comprising:
a laser projector;
a spirit level integral to the laser projector; and
a camera;
wherein the at least one projection device is attached to an anchor point of a fuselage of the aircraft; and
a display device comprising a screen, the display device being positioned on the aircraft tractor so the screen is visible to an operator of the aircraft tractor;

the method comprising:
fixing the projection device to an anchor point of the fuselage;
generating at least one laser beam using the laser projector of each projection device;
adjusting, using at least the spirit level of the projection device, at least a verticality of the laser beam generated by the laser projector;
plotting, using the laser projector, a light trace on the ground from the at least one laser beam to assist in guiding the aircraft on the ground;
filming the light trace on the ground;
positioning the display device on the aircraft tractor in a position that is visible to an operator of the aircraft tractor; and
connecting the projection device and the display device; and
displaying the image from the camera of each projection device on the display device.

7. The method according to claim 6, the laser projector being a rotary laser level and the method comprising:
generating a vertical plane by sweeping the laser beam of the rotary laser level;
plotting the light trace on the fuselage;
adjusting, using at least the spirit level of the projection device, the verticality of the vertical plane generated by the rotary laser level; and
adjusting a position of the light trace on the fuselage to coincide with at least two markers present on the fuselage to superimpose the vertical plane generated by the rotary laser level on a vertical plane of symmetry of the fuselage.

8. The method according to claim 7, wherein the vertical plane generated by sweeping the laser beam comprising the anchor point of the fuselage when the projection device is fixed to the anchor point, and wherein adjusting the position of the light trace on the fuselage to coincide with at least two markers is performed with a marker present on the fuselage in order to superimpose the vertical plane generated by the rotary laser level on the vertical plane of symmetry of the fuselage.

* * * * *